(12) United States Patent
Yokoyama et al.

(10) Patent No.: US 11,491,967 B2
(45) Date of Patent: Nov. 8, 2022

(54) CONTROL SYSTEM AND CONTROL METHOD FOR HYBRID VEHICLE

(71) Applicant: TOYOTA JIDOSHA KABUSHIKI KAISHA, Aichi-ken (JP)

(72) Inventors: Daiki Yokoyama, Gotemba (JP); Masanori Shimada, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 43 days.

(21) Appl. No.: 17/336,308

(22) Filed: Jun. 2, 2021

(65) Prior Publication Data

US 2021/0387611 A1 Dec. 16, 2021

(30) Foreign Application Priority Data

Jun. 16, 2020 (JP) .............................. JP2020-103721

(51) Int. Cl.
*B60W 20/16* (2016.01)
*B60W 10/06* (2006.01)
*G06N 20/00* (2019.01)
*B60W 10/08* (2006.01)
*B60W 20/40* (2016.01)

(52) U.S. Cl.
CPC ............ *B60W 20/16* (2016.01); *B60W 10/06* (2013.01); *B60W 10/08* (2013.01); *B60W 20/40* (2013.01); *G06N 20/00* (2019.01); *B60W 2510/244* (2013.01); *B60W 2555/60* (2020.02); *B60W 2556/45* (2020.02)

(58) Field of Classification Search
CPC ...... B60W 20/16; B60W 20/40; B60W 20/15; B60W 10/06; B60W 10/08; B60W 2510/244; B60W 2510/0604; B60W 2510/0638; B60W 2556/45; B60W 50/06; B60W 2050/0014; B60W 2050/0039; B60W 2050/065; B60W 2540/10; B60W 2556/50; B60W 2556/60
See application file for complete search history.

(56) References Cited

U.S. PATENT DOCUMENTS

| | | | |
|---|---|---|---|
| 9,925,987 B1 * | 3/2018 | Nguyen | G08G 1/0129 |
| 2017/0322558 A1 * | 11/2017 | Teshima | B60Q 3/20 |
| 2018/0170349 A1 * | 6/2018 | Jobson | B60L 7/18 |
| 2018/0290662 A1 * | 10/2018 | Decker | B60W 40/09 |
| 2020/0094757 A1 * | 3/2020 | Murray | B62D 1/183 |
| 2021/0387611 A1 * | 12/2021 | Yokoyama | B60W 10/26 |
| 2022/0089146 A1 * | 3/2022 | Yokoyama | B60W 20/16 |

FOREIGN PATENT DOCUMENTS

JP 2012111369 A 6/2012

* cited by examiner

*Primary Examiner* — George C Jin
(74) *Attorney, Agent, or Firm* — Hauptman Ham, LLP

(57) ABSTRACT

A control system for a hybrid vehicle which includes an internal combustion engine and an electric motor and whose drive mode is switchable between an electric vehicle mode and a hybrid vehicle mode includes: an on-board learning unit mounted on the hybrid vehicle and configured to perform a learning action; a position determination unit configured to determine whether the hybrid vehicle is located in a low emission area where operation of the internal combustion engine is supposed to be restricted; and a learning control unit configured to at least partially stop the learning action of the on-board learning unit when determination is made that the hybrid vehicle is located in the low emission area.

9 Claims, 13 Drawing Sheets

CONTROL SYSTEM AND CONTROL METHOD FOR HYBRID VEHICLE

CROSS-REFERENCE TO RELATED APPLICATION

This application claims priority to Japanese Patent Application No. 2020-103721 filed on Jun. 16, 2020, incorporated herein by reference in its entirety.

BACKGROUND

1. Technical Field

The present disclosure relates to control systems and control methods for hybrid vehicles.

2. Description of Related Art

Hybrid vehicles are known in the art which include an internal combustion engine and an electric motor and whose drive mode is switchable between an electric vehicle (EV) mode and a hybrid vehicle (HV) mode. In the EV mode, the internal combustion engine is stopped and the electric motor is operated. In the HV mode, the internal combustion engine and the electric motor are operated.

In view of exhaust emissions and noise, it is preferable to set the drive mode to the EV mode in a specific area such as a residential area. However, electric power is required to continue the EV mode in the specific area. A hybrid vehicle is known in which electric power is generated by regenerative control during deceleration operation to keep the state of charge (SOC) of a battery as high as possible before the hybrid vehicle enters a specific area (see, e.g., Japanese Unexamined Patent Application Publication No. 2012-111369 (JP 2012-111369 A)).

SUMMARY

However, in view of the battery capacity and the frequency of regenerative control, there is a limit to increasing the SOC of the battery. Accordingly, the SOC of the battery may become excessively low in the specific area, and the EV mode may not be able to be continued. In this case, the internal combustion engine has to be operated in order to keep the vehicle running in the specific area.

The present disclosure provides a control system and a control method for a hybrid vehicle.

A first aspect of the present disclosure relates to a control system for a hybrid vehicle. The control system for the hybrid vehicle includes: an on-board learning unit mounted on the hybrid vehicle and configured to perform a learning action; a position determination unit configured to determine whether the hybrid vehicle is located in a low emission area where operation of an internal combustion engine is supposed to be restricted; and a learning control unit configured to at least partially stop the learning action of the on-board learning unit when determination is made that the hybrid vehicle is located in the low emission area. The hybrid vehicle includes the internal combustion engine and an electric motor. A drive mode of the hybrid vehicle is switchable between an electric vehicle mode and a hybrid vehicle mode. The electric vehicle mode is a mode in which the internal combustion engine is stopped and the electric motor is operated, and the hybrid vehicle mode is a mode in which the internal combustion engine and the electric motor are operated.

In the first aspect, the learning control unit may be configured to entirely stop the learning action of the on-board learning unit when determination is made that the hybrid vehicle is located in the low emission area.

In the above aspect, in a case where determination is made that the hybrid vehicle is located in the low emission area, the learning control unit may be configured to at least partially stop the learning action of the on-board learning unit when determination is made that an SOC of a battery of the hybrid vehicle is lower than a predetermined threshold, and may be configured not to stop the learning action of the on-board learning unit when determination is made that the SOC of the battery is equal to or higher than the threshold.

In the above aspect, the learning control unit may be configured to increase a proportion of the learning action of the on-board learning unit that is stopped as the SOC of the battery decreases when determination is made that the hybrid vehicle is located in the low emission area and determination is made that the SOC of the battery is lower than the threshold.

In the above aspect, the control system may further include a server learning unit mounted on a server located outside the hybrid vehicle, and configured to perform a learning action. The server learning unit may be configured to perform the learning action to be performed by the on-board learning unit using data sent from the hybrid vehicle to the server and send a learning result of the server learning unit to the hybrid vehicle, when the learning action of the on-board learning unit is stopped.

In the above aspect, the learning control unit may be configured to send the data from the hybrid vehicle to the server when determination is made that that the hybrid vehicle is located outside the low emission area.

In the above aspect, in a case where determination is made that the hybrid vehicle is located outside the low emission area, the learning control unit may be configured not to send the data from the hybrid vehicle to the server when determination is made that the hybrid vehicle is located in a non-adjacent area that is not adjacent to the low emission area, and may be configured to send the data from the hybrid vehicle to the server when determination is made that the hybrid vehicle is located in an adjacent area that is adjacent to the low emission area.

In the above aspect, the learning control unit may be configured to repeatedly send the data from the hybrid vehicle to the server when determination is made that the hybrid vehicle is located outside the low emission area.

A second aspect of the present disclosure relates to a control method for a hybrid vehicle. The control method for the hybrid vehicle includes: performing a learning action by an on-board learning unit mounted on the hybrid vehicle; determining whether the hybrid vehicle is located in a low emission area where operation of an internal combustion engine is supposed to be restricted; and at least partially stopping the learning action of the on-board learning unit when determination is made that the hybrid vehicle is located in the low emission area. The hybrid vehicle includes the internal combustion engine and an electric motor. A drive mode of the hybrid vehicle is switchable between an electric vehicle mode and a hybrid vehicle mode. The electric vehicle mode is a mode in which the internal combustion engine is stopped and the electric motor is operated, and the hybrid vehicle mode is a mode in which the internal combustion engine and the electric motor are operated.

According to each aspect of the present disclosure, the EV mode of the hybrid vehicle is reliably continued in the low emission area where the operation of the internal combustion engine is supposed to be restricted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
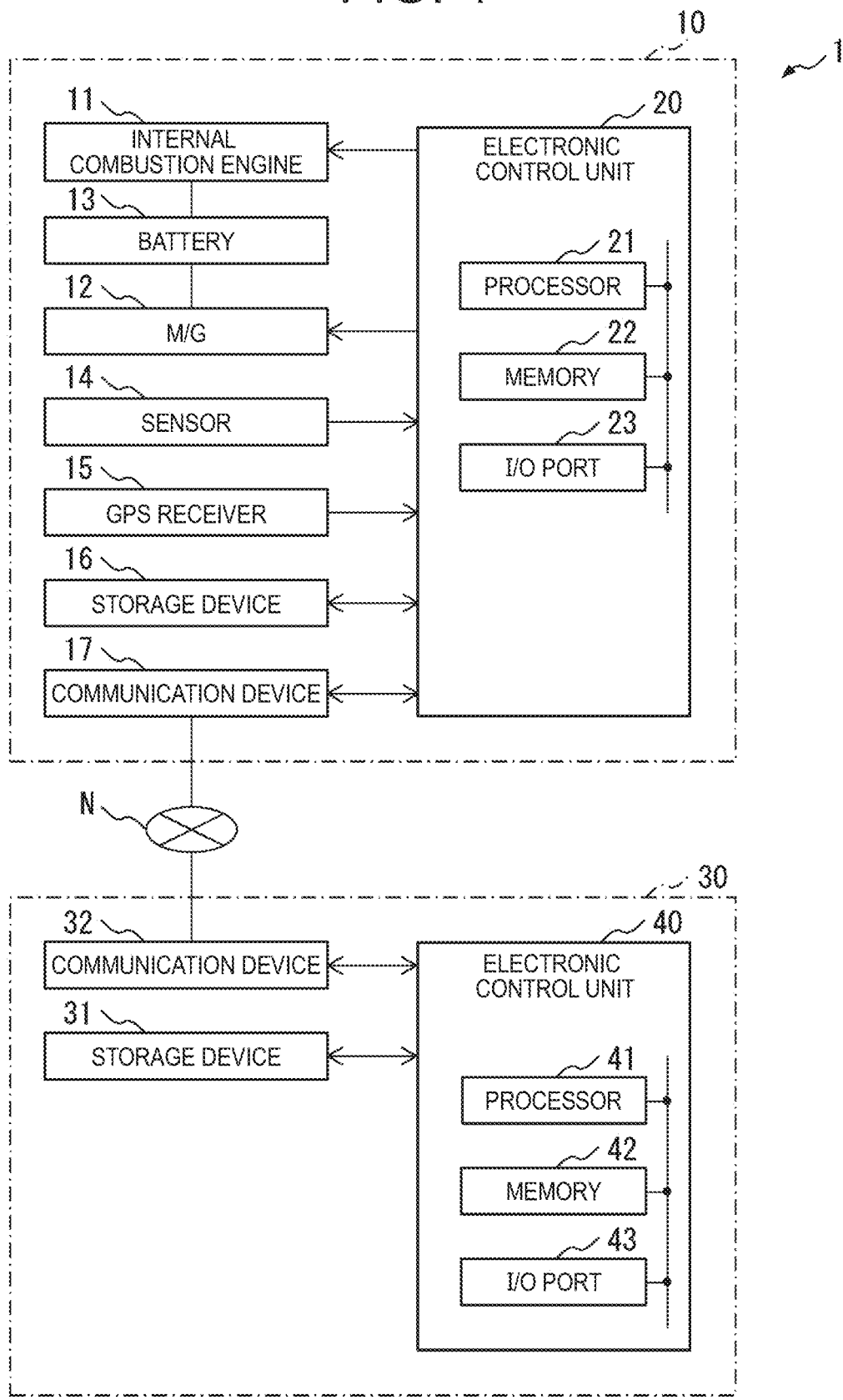
FIG. 1 is a schematic overall view of a control system of a first embodiment according to the present disclosure.

A first embodiment according to the present disclosure will be described with reference to FIGS. 1 to 7. Referring to FIG. 1, a control system 1 for a hybrid vehicle of the first embodiment according to the present disclosure includes a hybrid vehicle 10 and a server 30 outside the hybrid vehicle 10.

The hybrid vehicle 10 of the first embodiment according to the present disclosure includes an internal combustion engine 11, a motor generator (M/G) 12, a battery 13, at least one sensor 14, a Global Positioning System (GPS) receiver 15, a storage device 16, a communication device 17, and an electronic control unit 20. The internal combustion engine 11 is, e.g., a spark ignition engine or a compression ignition engine. The internal combustion engine 11 (e.g., fuel injection valves, spark plugs, a throttle valve, etc.) is controlled based on signals from the electronic control unit 20. The motor generator 12 operates as an electric motor or a generator. The motor generator 12 is controlled based on signals from the electronic control unit 20.

In the first embodiment according to the present disclosure, the drive mode of the hybrid vehicle 10 can be switched between an EV mode and an HV mode. In the EV mode of the first embodiment according to the present disclosure, the internal combustion engine 11 is stopped and the motor generator 12 is operated as an electric motor. In this case, the output of the motor generator 12 is transmitted to axles. In the HV mode of the first embodiment according to the present disclosure, the internal combustion engine 11 is operated and the motor generator 12 is operated as an electric motor. In this case, in one example, the output of the internal combustion engine 11 and the output of the motor generator 12 are transmitted to the axles. In another example, the output of the motor generator 12 is transmitted to the axles, and the output of the internal combustion engine 11 is transmitted to a generator (not shown) to operate the generator. Electric power generated by the generator is sent to the motor generator 12 or the battery 13. In still another example, a part of the output of the internal combustion engine 11 and the output of the motor generator 12 are transmitted to the axles, and the rest of the output of the internal combustion engine 11 is transmitted to the generator. Electric power generated by the generator is sent to the motor generator 12 or the battery 13. In the first embodiment according to the present disclosure, in the EV mode and the HV mode, regenerative control using the motor generator 12 as a generator is performed during, e.g., deceleration operation. Electric power generated by the regenerative control is sent to the battery 13.

The battery 13 of the first embodiment according to the present disclosure is charged by electric power from the motor generator 12 operating as a generator or from the generator (not shown). In another embodiment (not shown), the battery 13 can also be charged by an external power supply. In the first embodiment according to the present disclosure, electric power is supplied from the battery 13 to the motor generator 12 operating as an electric motor, the electronic control unit 20, and other in-vehicle devices.

The sensor 14 of the first embodiment according to the present disclosure detects various raw data. Examples of the sensor 14 of the first embodiment according to the present disclosure include a load sensor for detecting a required vehicle load that is represented by the amount of depression of an accelerator pedal, a throttle valve opening degree sensor for detecting the throttle valve opening degree of the internal combustion engine 11, a NOx sensor for detecting the NOx concentration in exhaust gas of the internal combustion engine 11, a rotational speed sensor for detecting the rotational speed of the internal combustion engine 11, a voltmeter for detecting the voltage of the battery 13, and an ammeter for detecting the current of the battery 13. Output signals of these sensors 14 are input to the electronic control unit 20.

The GPS receiver 15 of the first embodiment according to the present disclosure receives a signal from a GPS satellite and detects information indicating the absolute position (e.g., latitude and longitude) of the vehicle 10 from the received signal. The position information of the vehicle 10 is input to the electronic control unit 20.

Various data are stored in advance in the storage device 16 of the first embodiment according to the present disclosure. The communication device 17 of the first embodiment according to the present disclosure can be connected to a communication network N such as the Internet.

The electronic control unit 20 of the vehicle 10 of the first embodiment according to the present disclosure includes one or more processors 21, one or more memories 22, and an input and output (I/O) port 23. The one or more processors 21, the one or more memories 22, and the I/O port 23 are connected by a bidirectional bus so that they can communicate with each other. The memory 22 include, e.g., a read only memory (ROM), a random access memory (RAM), etc. The memory 22 has various programs stored therein, and various functions are implemented by executing these programs by the processor 21. The internal combustion engine 11, the motor generator 12, the sensor 14, the GPS receiver 15, the storage device 16, and the communication device 17 are connected to the I/O port 23 of the first embodiment according to the present disclosure so that they can communicate with the I/O port 23. In the processor 21 of the first embodiment according to the present disclosure, the state of charge (SOC) of the battery 13 is calculated based on, e.g., the voltage and current of the battery 13.

Referring to FIG. 1, the server 30 of the first embodiment according to the present disclosure includes a storage device 31, a communication device 32, and an electronic control unit 40.

Figure 2:
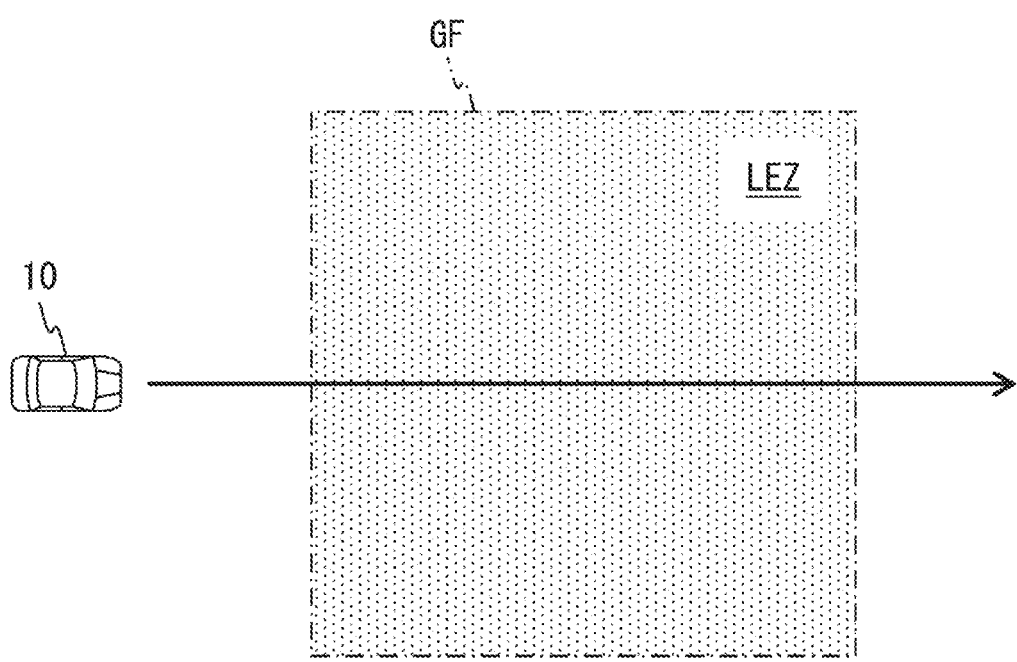
FIG. 2 schematically illustrates a low emission area of the first embodiment according to the present disclosure.

The storage device 31 of the first embodiment according to the present disclosure has stored therein position information (e.g., latitude and longitude) of a low emission area where the operation of the internal combustion engine 11 is supposed to be restricted. FIG. 2 schematically illustrates an example of the low emission area LEZ of the first embodiment according to the present disclosure. The low emission area LEZ of the first embodiment according to the present disclosure is surrounded by a closed boundary or geofence GF. For example, the low emission area LEZ is set in an urban area.

The communication device 32 of the first embodiment according to the present disclosure can be connected to the communication network N. The vehicle 10 and the server 30 can therefore be connected to each other via the communication network N.

Like the electronic control unit 20 of the vehicle 10, the electronic control unit 40 of the server 30 of the first embodiment according to the present disclosure includes one or more processors 41, one or more memories 42, and an I/O port 43, and the one or more processors 41, the one or more memories 42, and the I/O port 43 are connected by a bidirectional bus so that they can communicate with each other. The storage device 31 and the communication device 32 are connected to the I/O port 43 of the first embodiment according to the present disclosure so that they can communicate with the I/O port 43.

Figure 3:
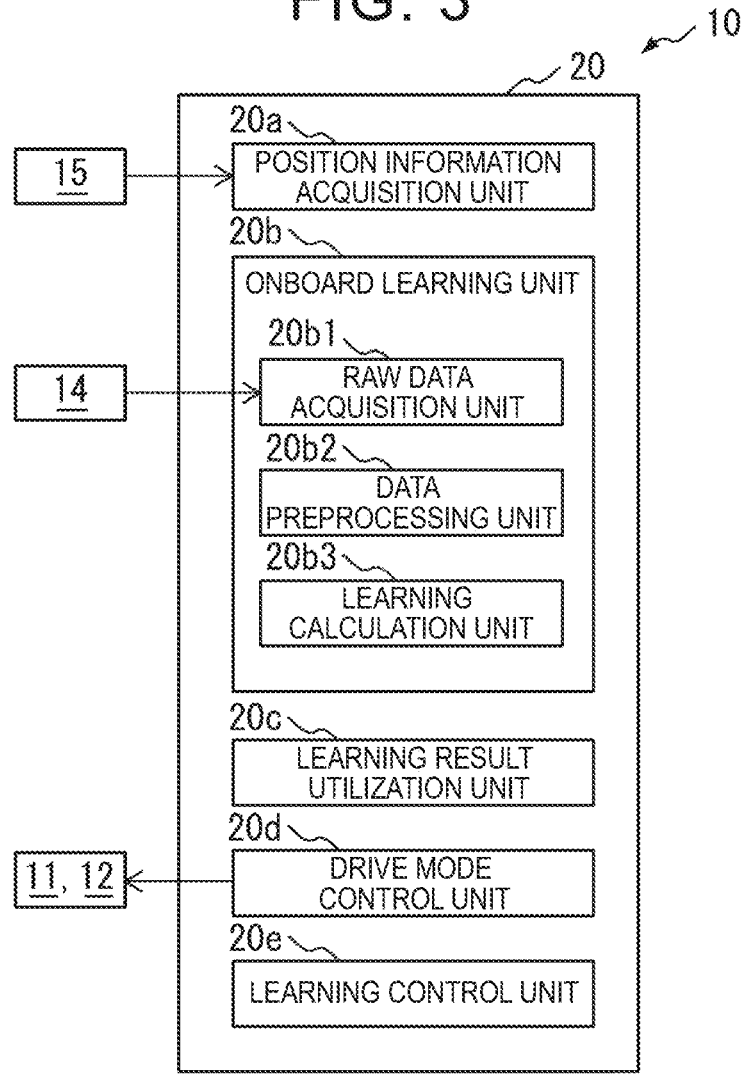
FIG. 3 is a functional block diagram of a vehicle in the first embodiment according to the present disclosure.

FIG. 3 is a functional block diagram of the vehicle 10 of the first embodiment according to the present disclosure. Referring to FIG. 3, the electronic control unit 20 of the vehicle 10 includes a position information acquisition unit 20a, an on-board learning unit 20b, a learning result utilization unit 20c, a drive mode control unit 20d, and a learning control unit 20e.

The position information acquisition unit 20a of the first embodiment according to the present disclosure acquires the position information of the vehicle 10 from the GPS receiver 15. The position information acquisition unit 20a sends this position information to the server 30.

The on-board learning unit 20b of the first embodiment according to the present disclosure performs a learning action. The on-board learning unit 20b includes a raw data acquisition unit 20b1, a data preprocessing unit 20b2, and a learning calculation unit 20b3.

The raw data acquisition unit 20b1 of the first embodiment according to the present disclosure acquires raw data necessary for learning. The raw data include, e.g., the output of the sensor 14, the calculation result of the processor 21, etc.

The data pre-processing unit 20b2 of the first embodiment according to the present disclosure preprocesses the raw data acquired by the raw data acquisition unit 20b1 to generate a data set suitable for learning. This preprocessing includes filtering, cleansing, normalization, standardization, etc. Examples of the data set include a data set suitable for supervised learning, a data set suitable for unsupervised learning, and a data set suitable for reinforcement learning.

The learning calculation unit 20b3 of the first embodiment according to the present disclosure performs learning using the data set generated by the data preprocessing unit 20b2. In one example, supervised learning using a neural network is performed. That is, the weight of the neural network is repeatedly calculated until the difference between the output of the neural network when a certain value is input and the training data corresponding to the certain value becomes smaller than a convergence value. In another example, learning using random forest, learning using support vector machine, ensemble learning in which a plurality of calculation models is used in parallel or in series, etc. is performed.

In one example, the learning results of the learning calculation unit 20b3 or the on-board learning unit 20b represent a calculation model. In other words, a calculation model is created or updated by the learning action of the learning calculation unit 20b3 or the on-board learning unit 20b. An example of the calculation model is a calculation model that outputs the NOx emission amount of the internal combustion engine 11 from the throttle valve opening degree, the engine speed, and the ignition timing. In this example, the raw data acquisition unit 20b1 acquires raw data necessary for learning, such as the throttle valve opening degree, the engine speed, and the ignition timing. Another example of the calculation model is a calculation model that outputs the degree of degradation of the battery 13 from the air temperature, the temperature of the battery 13, the discharge time of the battery 13, and the discharge energy of the battery 13 per unit time.

Referring to FIG. 3, the learning result utilization unit 20c of the first embodiment according to the present disclosure performs a predetermined process by using the learning results of the learning calculation unit 20b3 or the on-board learning unit 20b. In one example, the vehicle 10, such as the internal combustion engine 11, the motor generator 12, and an in-vehicle infotainment system (not shown), is controlled using the calculation model created or updated by the on-board learning unit 20b.

The learning action of the on-board learning unit 20b of the first embodiment according to the present disclosure includes at least one of the functions of the on-board learning unit 20b, that is, at least one of acquisition of raw data by the raw data acquisition unit 20b1, preprocessing of data by the data preprocessing unit 20b2, and learning by the learning calculation unit 20b3.

Referring to FIG. 3, the drive mode control unit 20d of the first embodiment according to the present disclosure switches the drive mode between the EV mode and the HV mode. In one example, the EV mode is selected when the required vehicle load is lower than a predetermined set load, and the drive mode is switched to the HV mode when the required vehicle load becomes higher than the set load. The EV mode is also selected when the SOC of the battery 13 is higher than a predetermined set SOC, and the drive mode is switched to the HV mode when the SOC of the battery 13 becomes lower than the set SOC.

The learning control unit 20e of the first embodiment according to the present disclosure controls whether to perform or stop the learning action of the on-board learning unit 20b.

Figure 4:
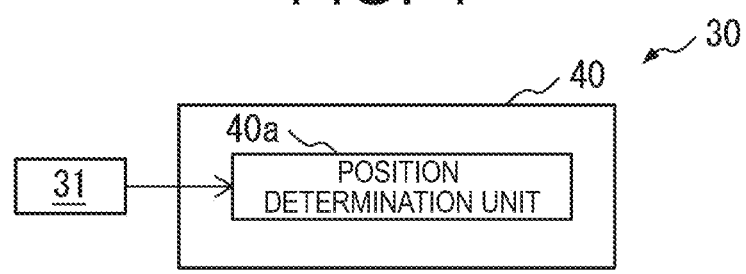
FIG. 4 is a functional block diagram of a server in the first embodiment according to the present disclosure.

FIG. 4 is a functional block diagram of the server 30 of the first embodiment according to the present disclosure. Referring to FIG. 4, the electronic control unit 40 of the server 30 includes a position determination unit 40a.

The position determination unit 40a of the first embodiment according to the present disclosure determines from the position information of the vehicle 10 sent from the vehicle 10 to the server 30 and the position information of the low emission area LEZ stored in the storage device 31 whether the vehicle 10 is located in the low emission area LEZ. The position determination unit 40a creates instruction data according to the determination result and sends the instruction data to the vehicle 10.

In the first embodiment according to the present disclosure, when the vehicle 10 acquires the position information of the vehicle 10, the vehicle 10 sends the position information of the vehicle 10 to the server 30. When the position determination unit 40a of the server 30 receives the position information of the vehicle 10, the position determination unit 40a determines from the received position information of the vehicle 10 and the position information of the low emission area LEZ stored in the storage device 31 whether the vehicle 10 is located in the low emission area LEZ. When the position determination unit 40a determines that the vehicle is located outside the low emission area LEZ, the position determination unit 40a creates instruction data including a learning permission instruction and sends the instruction data to the vehicle 10. When the position determination unit 40a determines that the vehicle 10 is located in the low emission area LEZ, the position determination unit 40a creates instruction data including a learning stop instruction and sends the instruction data to the vehicle 10.

When the vehicle 10 receives the instruction data from the server 30, the learning control unit 20e of the vehicle 10 determines whether the received instruction data includes a learning stop instruction. When the learning control unit 20e determines that the instruction data includes a learning permission instruction, the learning control unit 20e permits the learning action of the on-board learning unit 20b or the vehicle 10. As a result, for example, the calculation model is accurately created or updated, and satisfactory control is maintained. When the learning control unit 20e determines that the instruction data includes a learning stop instruction, the learning control unit 20e stops the learning action of the on-board learning unit 20b or the vehicle 10. This configuration limits power consumption of the vehicle 10 when the vehicle 10 is located in the low emission area LEZ. The SOC of the battery 13 is therefore less likely to fall below the set SOC. The EV mode is thus reliably continued in the low emission area LEZ.

Figure 5:
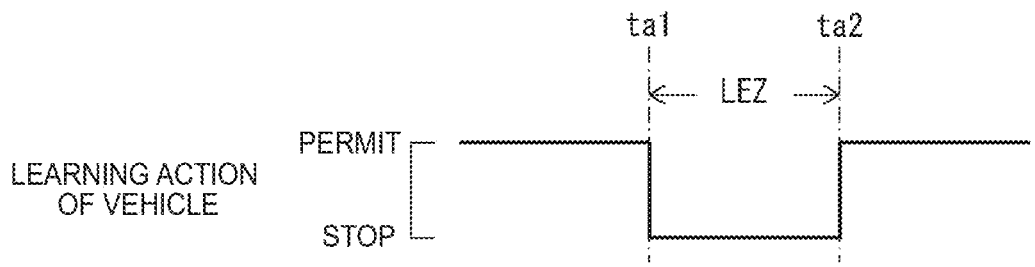
FIG. 5 is a timing chart illustrating the first embodiment according to the present disclosure.

That is, in an example of FIG. 5, it is determined until time ta1 that the vehicle 10 is located outside the low emission area LEZ. The learning action of the vehicle 10 or the on-board learning unit 20b is therefore permitted until time ta1. When it is determined at time ta1 that the vehicle 10 has entered the low emission area LEZ, the learning action of the vehicle 10 is stopped. When it is then determined at time ta2 that the vehicle 10 has left the low emission area LEZ, the learning action of the vehicle 10 is permitted again.

In one example, the learning action of the on-board learning unit 20b is entirely stopped when the learning action of the on-board learning unit 20b is supposed to be stopped. This configuration significantly reduces power consumption of the vehicle 10. In another example, the learning action of the on-board learning unit 20b is partially stopped. In this case, the learning action of the on-board learning unit 20b is partially continued while limiting power consumption of the vehicle 10. For example, in order to partially stop the learning action of the on-board learning unit 20b, at least one of the functions of the on-board learning unit 20b, that is, at least one of acquisition of raw data by the raw data acquisition unit 20b1, preprocessing of data by the data preprocessing unit 20b2, and learning by the learning calculation unit 20b3, is stopped. Alternatively, the frequency for the on-board learning unit 20b to perform the learning action is made lower than normal frequency. Alternatively, when a neural network is used for learning, the convergence value described above is made larger than a normal value. When random forest is used for learning, the number of decision trees is made smaller than a normal number of decision trees. When ensemble learning is used for learning, the number of learners to be used for ensemble learning is made smaller than a normal number of learners. Alternatively, the number of pieces of raw data or the number of pieces of preprocessed data to be used for the learning action is made smaller than a normal number of pieces of raw data or preprocessed data.

The larger the number of functions of the on-board learning unit 20b that are stopped, the higher the proportion of the learning action of the on-board learning unit 20b that is stopped. Alternatively, the lower the frequency for the on-board learning unit 20b to perform the learning action, the larger the convergence value, the smaller the number of decision trees, the smaller the number of learners, or the smaller the number of pieces of data to be used for the learning action, the higher the proportion of the learning action of the on-board learning unit 20b that is stopped. For example, the proportion of the learning action of the on-board learning unit 20b that is stopped is represented in the form of a numerical value between zero and 1. When the proportion is zero, the learning action is not stopped. When the proportion is 1, the learning action is entirely stopped.

Figure 6:
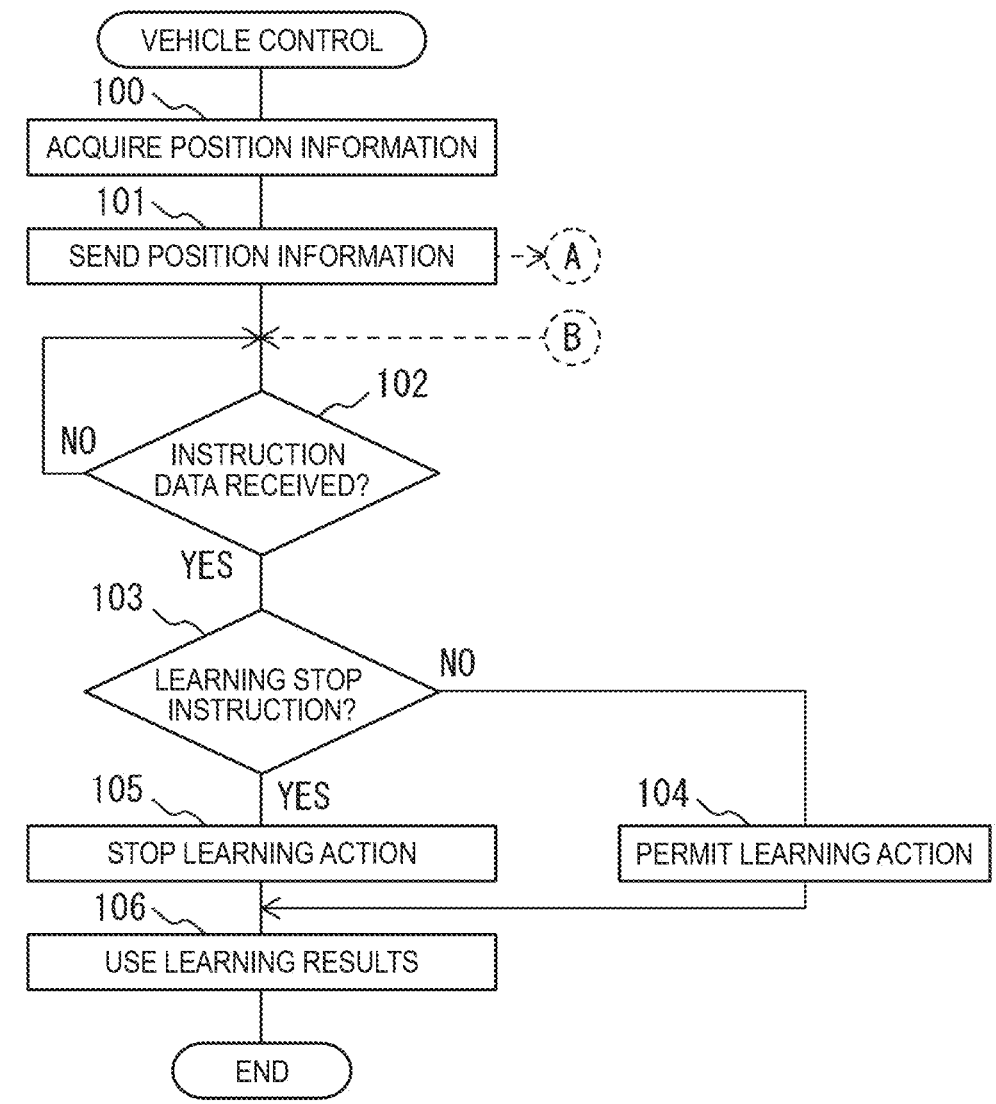
FIG. 6 is a flowchart of a vehicle control routine of the first embodiment according to the present disclosure.

FIG. 6 illustrates a routine for performing control of the vehicle 10 in the first embodiment according to the present disclosure. For example, this routine is repeated at predetermined set time intervals. Referring to FIG. 6, in step 100, the position information of the vehicle 10 is acquired. In step 101, the position information of the vehicle 10 is then sent to the server 30. Thereafter, in step 102, it is determined whether instruction data has been received from the server 30. Step 102 is repeated until it is determined that instruction data has been received from the server 30. When it is determined that instruction data has been received from the server 30, the routine proceeds to step 103, and it is determined whether the instruction data includes a learning permission instruction or includes a learning stop instruction. When it is determined that the instruction data includes a learning permission instruction, the routine proceeds to step 104, and the learning action of the vehicle 10 is permitted. The routine then proceeds to step 106. When it is determined that the instruction data includes a learning stop instruction, the routine proceeds to step 105, and the learning action of the vehicle 10 is stopped. The process then proceeds to step 106.

In step 106, for example, the vehicle 10 is controlled using the learning results. When the routine proceeds from step 105 to step 106, the vehicle 10 is controlled using the learning results obtained before the learning action is stopped.

Figure 7:
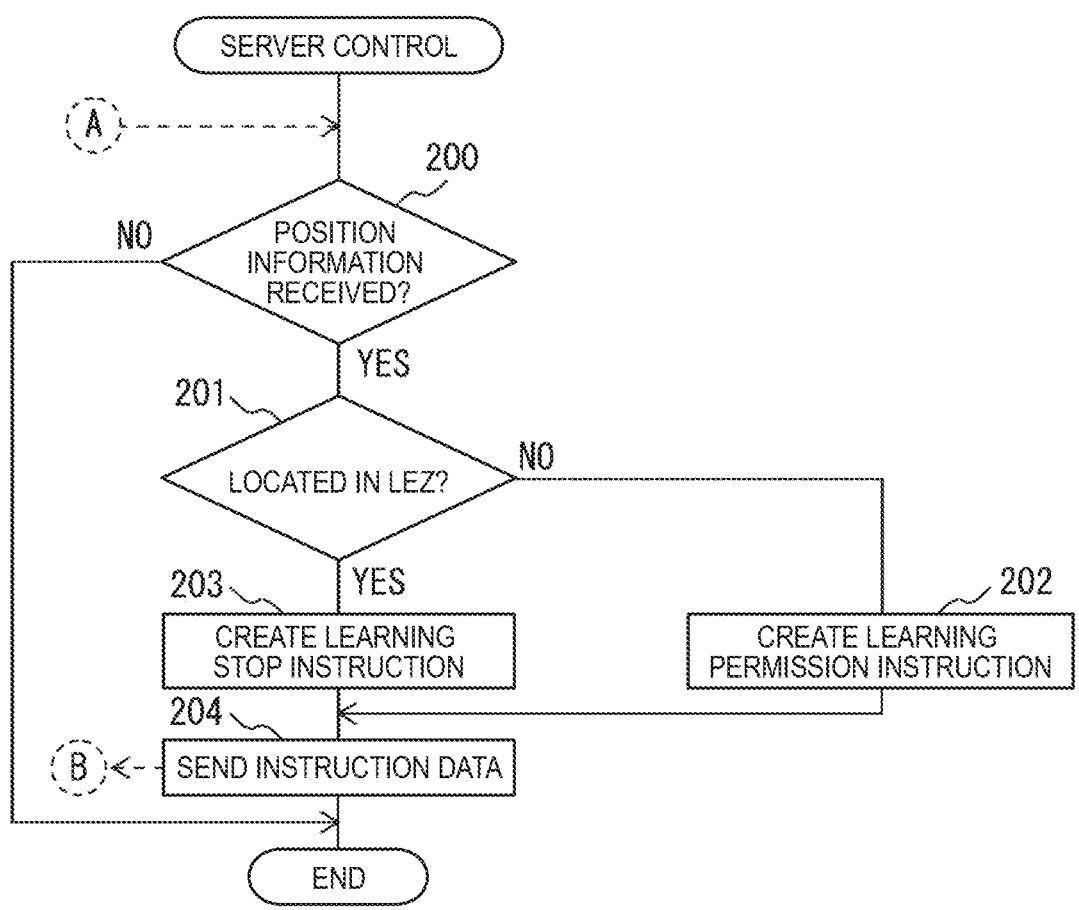
FIG. 7 is a flowchart of a server control routine of the first embodiment according to the present disclosure.

FIG. 7 illustrates a routine for performing control of the server 30 in the first embodiment according to the present disclosure. For example, this routine is repeated at predetermined set time intervals. Referring to FIG. 7, in step 200, it is determined whether the position information of the vehicle 10 has been received from the vehicle 10. When it is determined that the position information of the vehicle 10 has not been received, the process cycle is ended. When it is determined that the position information of the vehicle 10 has been received, the routine proceeds to step 201, and it is determined whether the vehicle 10 is located in the low emission area LEZ. When it is determined that the vehicle 10 is located outside the low emission area LEZ, the routine proceeds to step 202, and instruction data including a learning permission instruction is created. The routine then proceeds to step 204. When it is determined that the vehicle 10 is located in the low emission area LEZ, the routine proceeds to step 203, and instruction data including a learning stop instruction is created. The routine then proceeds to step 204. In step 204, the instruction data is sent to the vehicle 10.

In the first embodiment according to the present disclosure, as described above, the drive mode is switched to the EV mode or the HV mode based on the required vehicle load and the SOC of the battery 13. Accordingly, in order to maintain the EV mode in the low emission area LEZ or to prevent the drive mode from being switched to the HV mode in the low emission area LEZ, the driver of the vehicle 10 is required to adjust the required vehicle load (e.g., the amount of depression of the accelerator pedal), manage the SOC of the battery 13, etc. In another embodiment (not shown), when it is determined that the vehicle 10 is located in the low emission area LEZ, the drive mode control unit 20d automatically switches the drive mode to the EV mode and maintains the EV mode.

Figure 8:
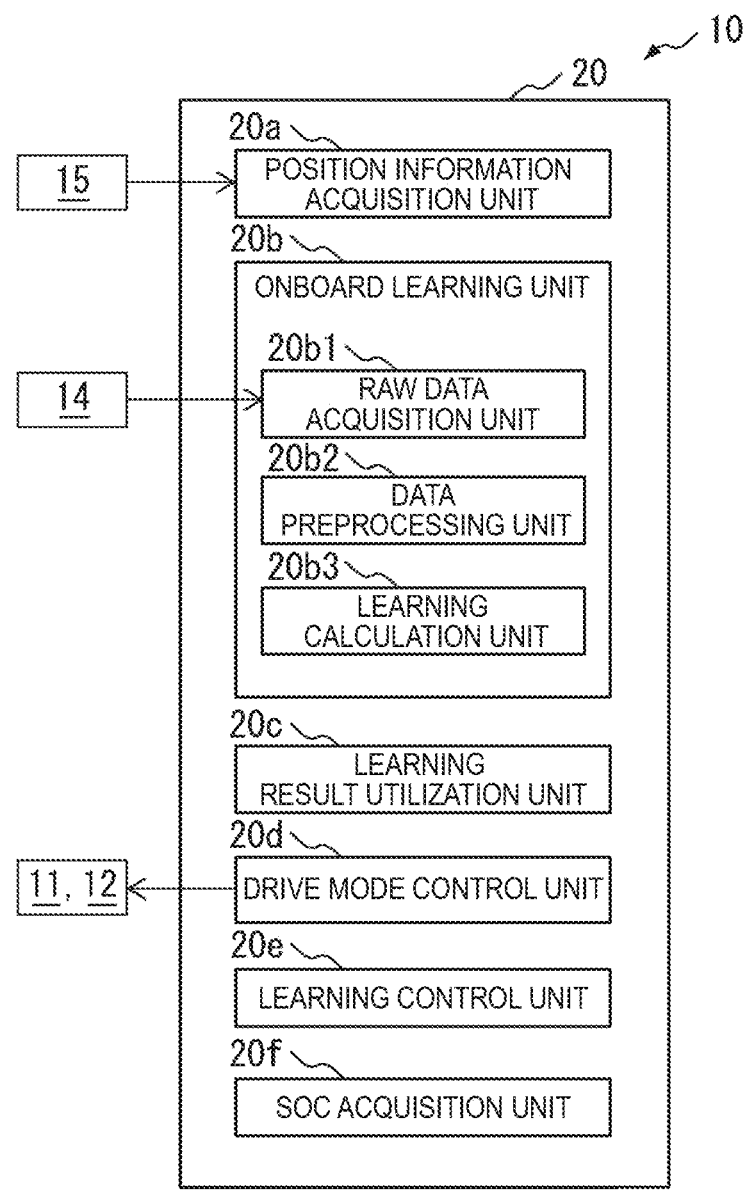
FIG. 8 is a functional block diagram of a vehicle in a second embodiment according to the present disclosure.

Next, a second embodiment according to the present disclosure will be described with reference to FIGS. 8 to 11. The second embodiment according to the present disclosure is different from the first embodiment according to the present disclosure in the following points. As shown in FIG. 8, the electronic control unit 20 of the vehicle 10 of the second embodiment according to the present disclosure includes an SOC acquisition unit 20f. The SOC acquisition unit 20f acquires the SOC of the battery 13 from, e.g., the processor 21.

In the first embodiment according to the present disclosure, when it is determined that the vehicle 10 is located in the low emission area LEZ, the learning action of the vehicle 10 is at least partially stopped. This configuration reduces power consumption of the vehicle 10 and limits reduction in SOC of the battery 13. However, when the SOC of the battery 13 is high, there is little need to limit power consumption of the vehicle 10.

Therefore, in the second embodiment according to the present disclosure, when it is determined that the vehicle 10 is located in the low emission area LEZ and the SOC of the battery 13 is equal to or higher than a predetermined threshold SOCx, the learning action of the vehicle 10 is not stopped but is permitted. However, when it is determined that the vehicle 10 is located in the low emission area LEZ and the SOC of the battery 13 is lower than the threshold SOCx, the learning action of the vehicle 10 is stopped.

Figure 9:
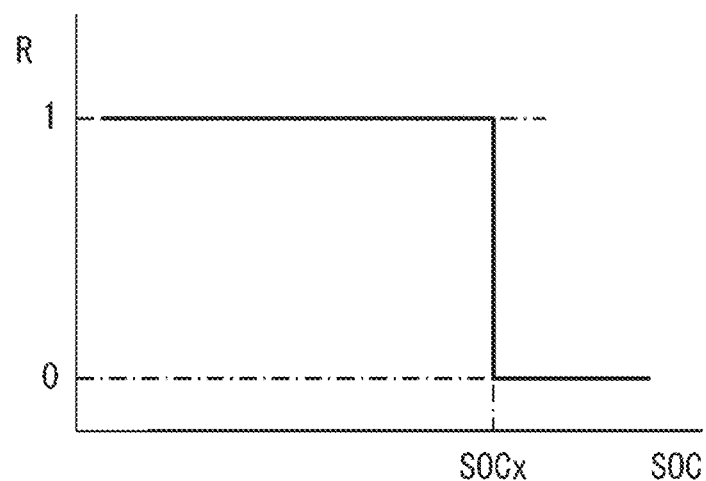
FIG. 9 is a graph illustrating an example of the proportion of a learning action that is stopped in the second embodiment according to the present disclosure.

In one example, when the SOC of the battery 13 is lower than the threshold SOCx, the learning action of the vehicle 10 is entirely stopped regardless of the SOC of the battery 13. When this is represented using the proportion R of the learning action of the vehicle 10 that is stopped, the proportion R is zero when the SOC of the battery 13 is equal to or higher than the threshold SOCx, as shown in FIG. 9. The proportion R is 1 when the SOC of the battery 13 is lower than the threshold SOCx.

Figure 10:
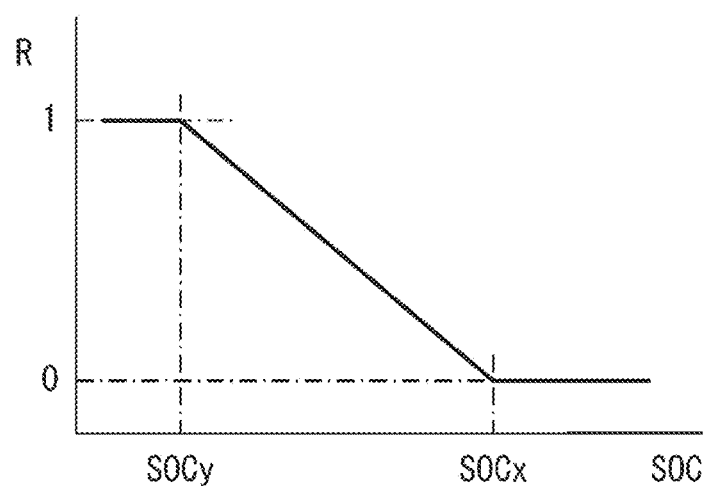
FIG. 10 is a graph illustrating another example of the proportion of the learning action that is stopped in the second embodiment according to the present disclosure.

In another example, when the SOC of the battery 13 is lower than the threshold SOCx, the proportion R of the learning action of the vehicle 10 that is stopped is increased as the SOC of the battery 13 decreases. That is, as shown in FIG. 10, the proportion R of the learning action of the vehicle 10 that is stopped is zero when the SOC of the battery 13 is equal to or higher than the threshold SOCx. When the SOC of the battery 13 is lower than the threshold SOCx, the proportion R is increased as the SOC of the battery 13 decreases. In the example shown in FIG. 10, when the SOC of the battery 13 is lower than another threshold SOCy, the proportion R of 1 is maintained, and the learning action is entirely stopped. The higher the proportion R, the more power consumption of the vehicle 10 is limited.

Figure 11:
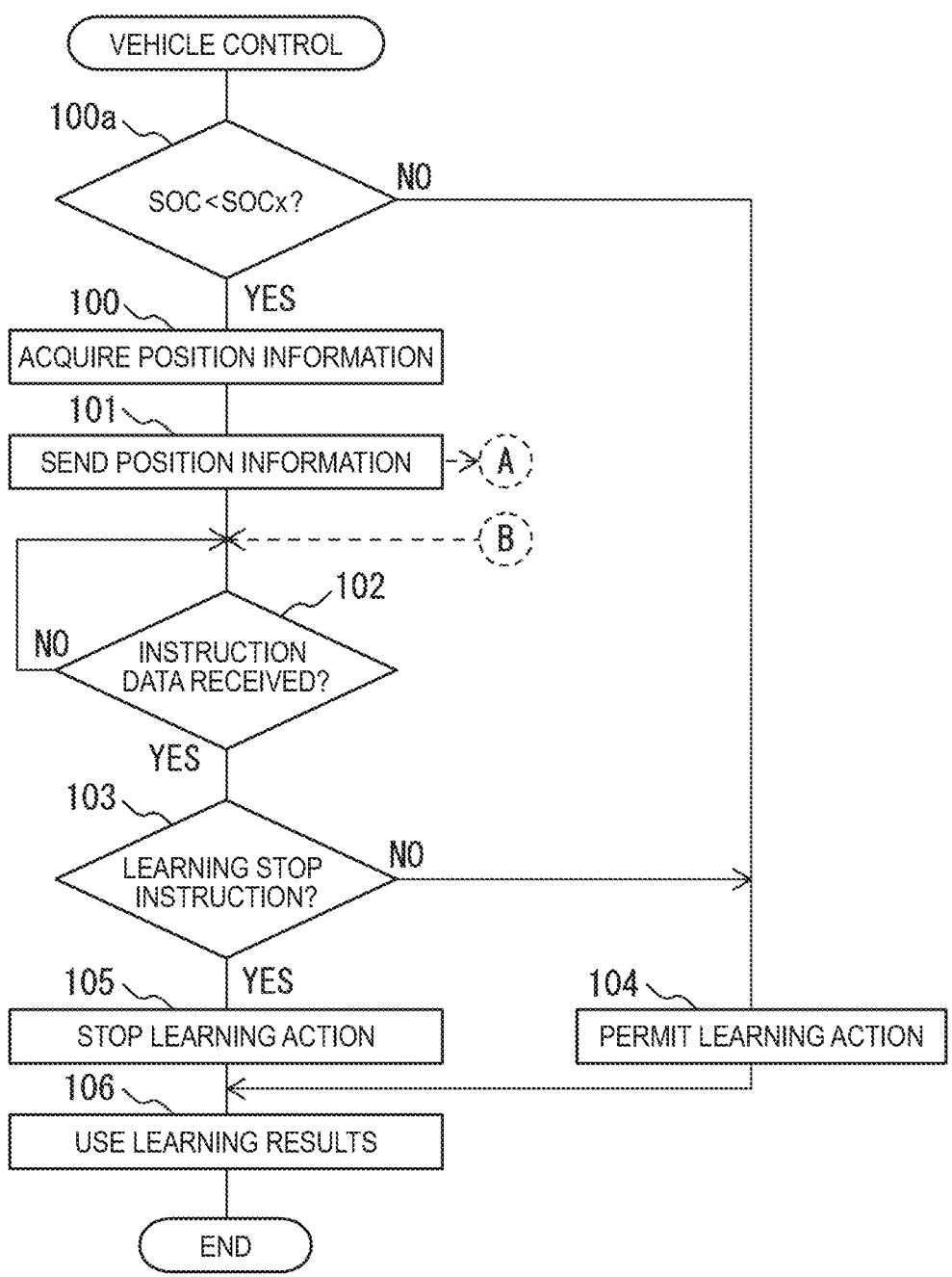
FIG. 11 is a flowchart of a vehicle control routine of the second embodiment according to the present disclosure.

FIG. 11 illustrates a routine for performing control of the vehicle 10 in the second embodiment according to the present disclosure. The routine of FIG. 11 is different from the routine of FIG. 6 in the following points. In the routine of FIG. 11, first, it is determined in step 100a whether the SOC of the battery 13 is lower than the threshold SOCx. When SOC<SOCx, the routine proceeds to step 100. Accordingly, when it is determined that SOC<SOCx and the vehicle 10 is located in the low emission area LEZ, the learning action of the vehicle 10 is stopped. When SOC SOCx, the routine proceeds from step 100a to step 104. When SOC SOCx, the learning action of the vehicle 10 is thus permitted regardless of whether the vehicle 10 is located in the low emission area LEZ.

In the second embodiment according to the present disclosure, when the SOC of the battery 13 is high, the stoppage of the learning action of the vehicle 10 is restricted. In another embodiment (not shown), the stoppage of the learning action of the vehicle 10 is restricted when the required load of the vehicle 10 is low or when a large amount of electric power is generated by the regenerative control of the vehicle 10. In this case, the SOC of the battery 13 is unlikely to become excessively low.

Figure 12:
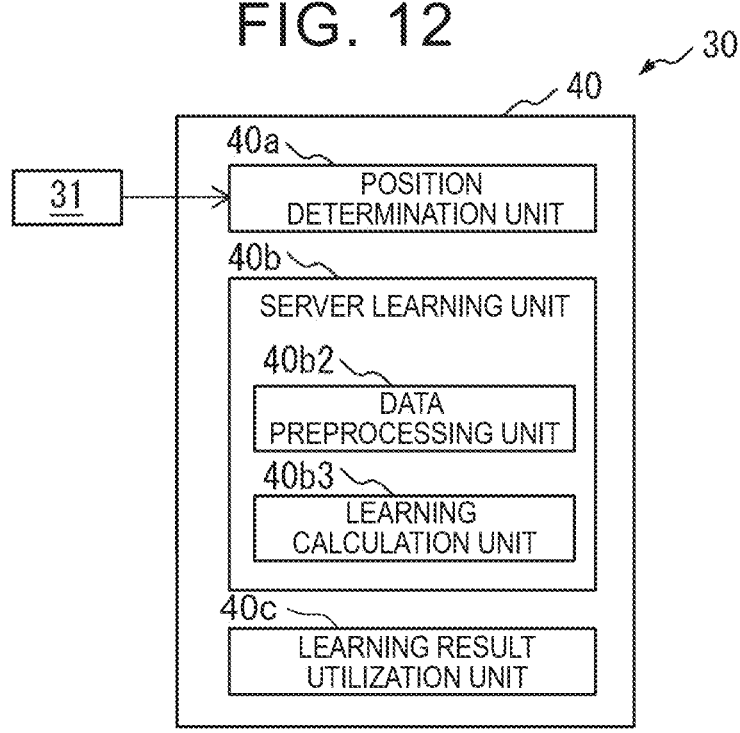
FIG. 12 is a functional block diagram of a server in a third embodiment according to the present disclosure.

Next, a third embodiment according to the present disclosure will be described with reference to FIGS. 12 to 15. The third embodiment according to the present disclosure is different from the first embodiment according to the present disclosure in the following points. As shown in FIG. 12, the electronic control unit 40 of the server 30 of the third embodiment according to the present disclosure includes a position determination unit 40a, a server learning unit 40b and a learning result utilization unit 40c. The server learning unit 40b performs the learning action. The server learning unit 40b includes a data preprocessing unit 40b2 and a learning calculation unit 40b3.

The data preprocessing unit 40b2, the learning calculation unit 40b3, and the learning result utilization unit 40c of the third embodiment according to the present disclosure are configured similarly to the data preprocessing unit 20b2, the learning calculation unit 20b3, and the learning result utilization unit 20c of the on-board learning unit 20b, respectively.

In the first embodiment according to the present disclosure, when it is determined that the vehicle 10 is located in the low emission area LEZ, the learning action of the vehicle 10 is at least partially stopped. However, while the learning action of the vehicle 10 is stopped, satisfactory control may not be able to be performed as, e.g., a calculation model is not created or updated.

Accordingly, in the third embodiment according to the present disclosure, when the learning action of the vehicle 10 is stopped, the learning action to be performed by the vehicle 10 is performed by the server 30, and the learning results of the server 30 are sent to the vehicle 10. In the vehicle 10, for example, the internal combustion engine 11 is controlled using the received learning results.

In the third embodiment according to the present disclosure, when the position determination unit 40a of the server 30 determines that the vehicle 10 is located outside the low emission area LEZ, the position determination unit 40a creates instruction data including a learning permission instruction and a data transmission instruction and sends the instruction data to the vehicle 10. When the learning control unit 20e of the vehicle 10 receives the data transmission instruction, the learning control unit 20e of the vehicle 10 sends data necessary for the learning action to the server 30. In this case, the data that is sent to the server 30 is, e.g., raw data acquired by the raw data acquisition unit 20b1.

When the data preprocessing unit 40b2 of the server learning unit 40b receives the raw data, the data processing unit 40b2 generates a data set suitable for learning from the raw data. The learning calculation unit 40b3 of the server learning unit 40b then performs learning using the data set generated by the data preprocessing unit 40b2. Thereafter, the learning calculation unit 40b3 sends the learning results to the vehicle 10.

When the learning result utilization unit 20c of the vehicle 10 receives the learning results, the learning result utilization unit 20c performs a predetermined process, for example, controls the internal combustion engine 11, using the learning results. Satisfactory control is thus continued in the vehicle 10 while limiting power consumption of the vehicle 10.

In another embodiment (not shown), the data that is sent from the vehicle 10 to the server 30 is a data set generated by the data preprocessing unit 20b2 of the vehicle 10. In this case, the server 30 does not need to include the data preprocessing unit 40b2.

Figure 13:
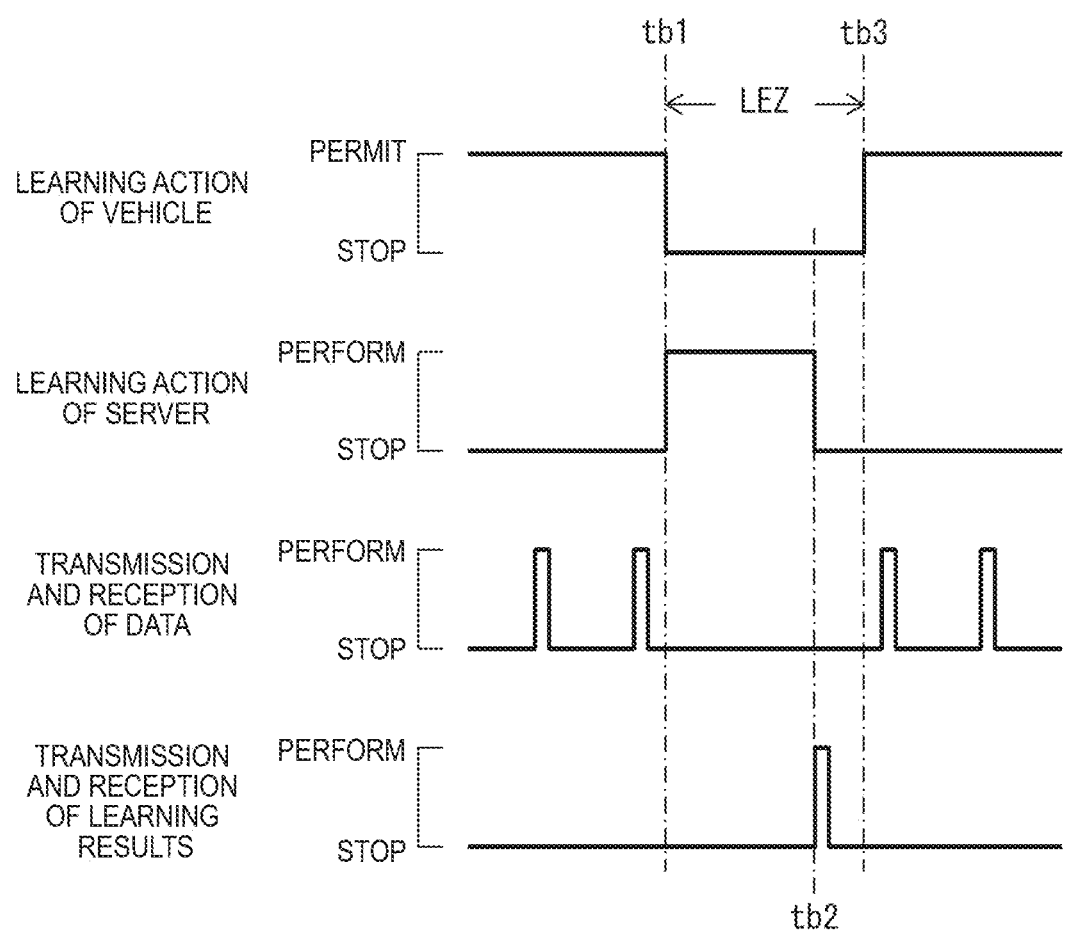
FIG. 13 is a timing chart illustrating the third embodiment according to the present disclosure.

In an example of FIG. 13, it is determined until time tb1 that the vehicle 10 is located outside the low emission area LEZ. Data necessary for learning is therefore sent from the vehicle 10 to the server 30 until time tb1. When it is determined at time tb1 that the vehicle 10 has entered the low emission area LEZ, the learning action of the vehicle 10 is stopped and the learning action of the server 30 is started. Subsequently, when the learning action of the server 30 is completed at time tb2, the learning results are sent from the server 30 to the vehicle 10. When it is then determined at time tb3 that the vehicle 10 has left the low emission area LEZ, the learning action of the vehicle 10 is permitted again, and data transmission from the vehicle 10 to the server is also resumed.

In the third embodiment according to the present disclosure, when it is determined that the vehicle 10 is located outside the low emission area LEZ, data transmission from the vehicle 10 to the server 30 is repeatedly performed. The server 30 performs the learning action using the most recent data out of the received data.

In another embodiment (not shown), data necessary for the learning action is sent from the vehicle 10 to the server 30 when it is determined that the vehicle 10 is located in the low emission area LEZ. However, electric power is consumed for the data transmission. Accordingly, in the third embodiment according to the present disclosure, data is sent from the vehicle 10 to the server 30 when it is determined that the vehicle 10 is located outside the low emission area LEZ.

Figure 14:
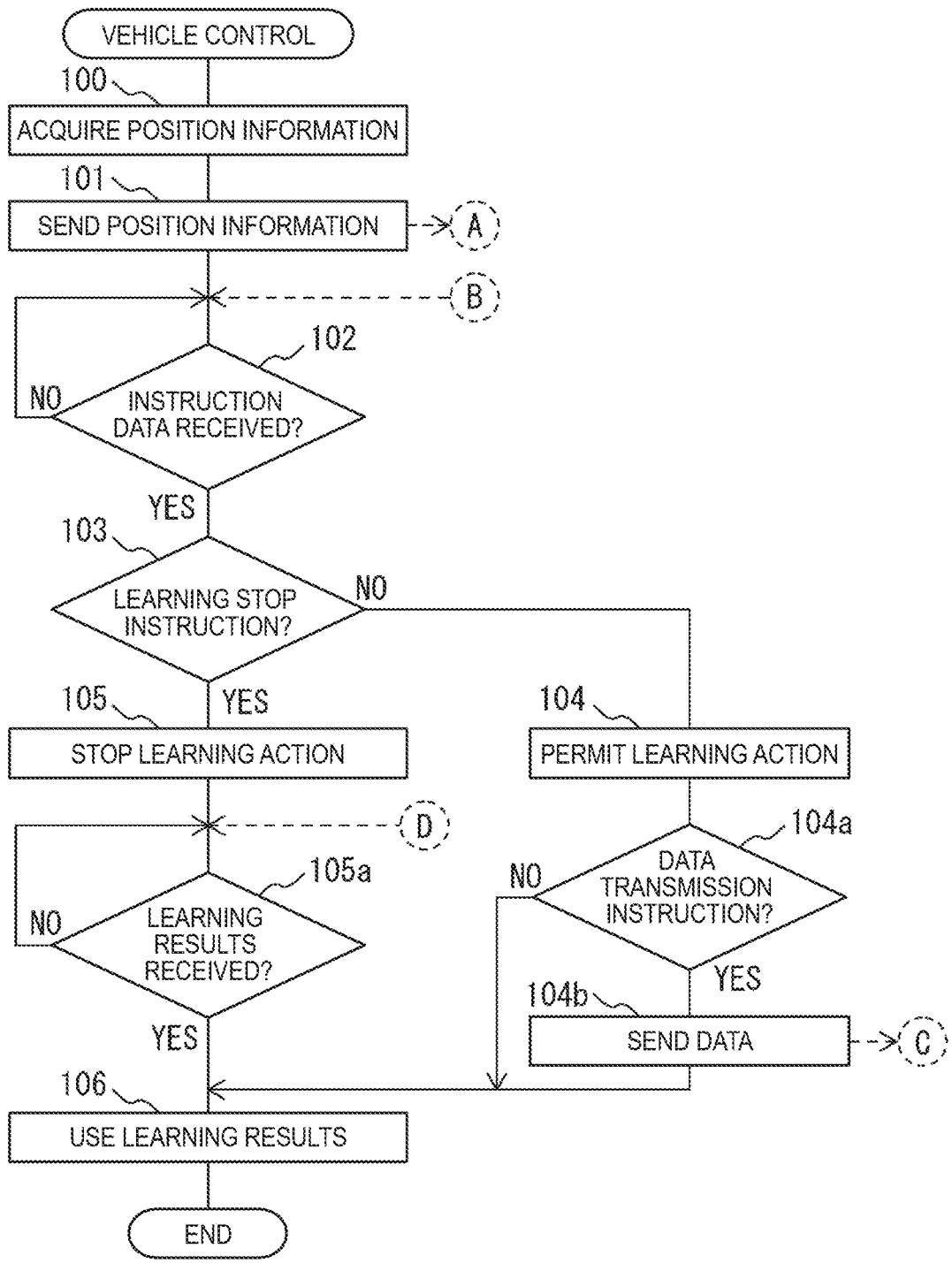
FIG. 14 is a flowchart of a vehicle control routine of the third embodiment according to the present disclosure.

FIG. 14 illustrates a routine for performing control of the vehicle 10 in the third embodiment according to the present disclosure. The routine of FIG. 14 is different from the routine of FIG. 6 in the following points. In the routine of FIG. 14, the routine proceeds from step 104 to step 104a, and it is determined whether the received instruction data includes a data transmission instruction. When the received instruction data does not include a data transmission instruction, the process cycle is ended. When the received instruction data includes a data transmission instruction, the routine proceeds to step 104b, and data necessary for the learning action is sent from the vehicle 10 to the server 30.

In the routine of FIG. 14, the routine proceeds from step 105 to step 105a, and it is determined whether the learning results have been received from the server 30. Step 105a is repeated until it is determined that the learning results have been received. When it is determined that the learning results have been received, the routine proceeds to step 106. When the routine proceeds from step 105a to step 106, the learning results from the server 30 are used.

Figure 15:
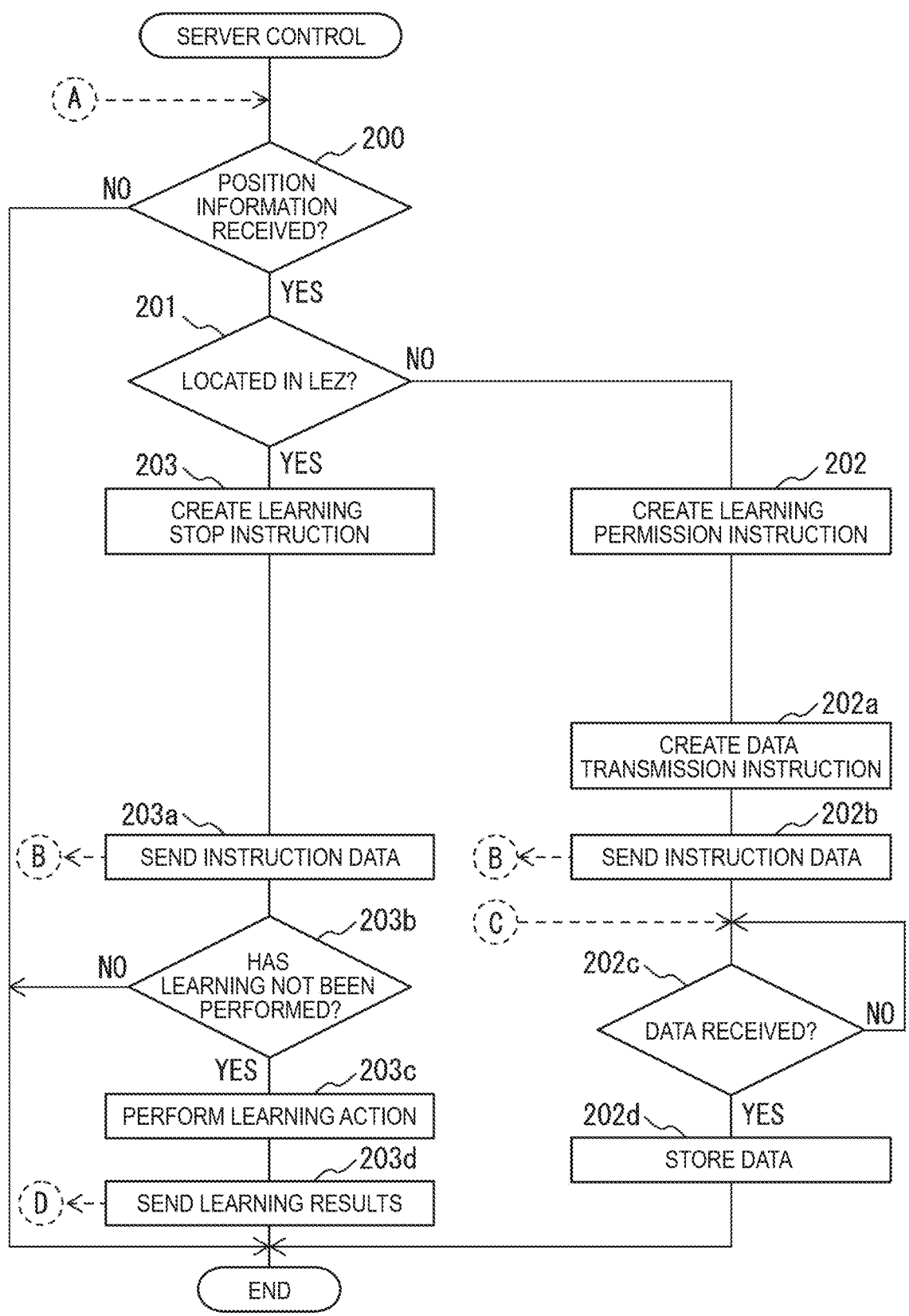
FIG. 15 is a flowchart of a server control routine of the third embodiment according to the present disclosure.

FIG. 15 illustrates a routine for performing control of the server 30 in the third embodiment according to the present disclosure. The routine of FIG. 15 is different from the routine of FIG. 7 in the following points. In the routine of FIG. 15, the routine proceeds from step 202 to step 202a, and a data transmission instruction is created. Thereafter, in step 202b, instruction data including the learning permission instruction and the data transmission instruction is sent to the vehicle 10. Subsequently, in step 202c, it is determined whether data necessary for the learning action has been received from the vehicle 10. Step 202c is repeated until it is determined that the data has been received. When it is determined that the data has been received, the routine proceeds to step 202d, and the data is stored in, e.g., the storage device 31. In one example, only the most recent data is stored.

The routine of FIG. 15 proceeds from step 203 to step 203a, and instruction data including a learning stop instruction is sent to the vehicle 10. Thereafter, in step 203b, it is determined whether the learning action of the server 30 has not been performed. When it is determined that the learning action of the server 30 has not been performed, the routine proceeds to step 203c, and the learning action is performed. Thereafter, in step 203d, the learning results of the server 30 are sent to the vehicle 10. When the learning action of the server 30 has been performed or completed, the process cycle is ended. This is because no data for performing the learning action has been newly received.

Figure 16:
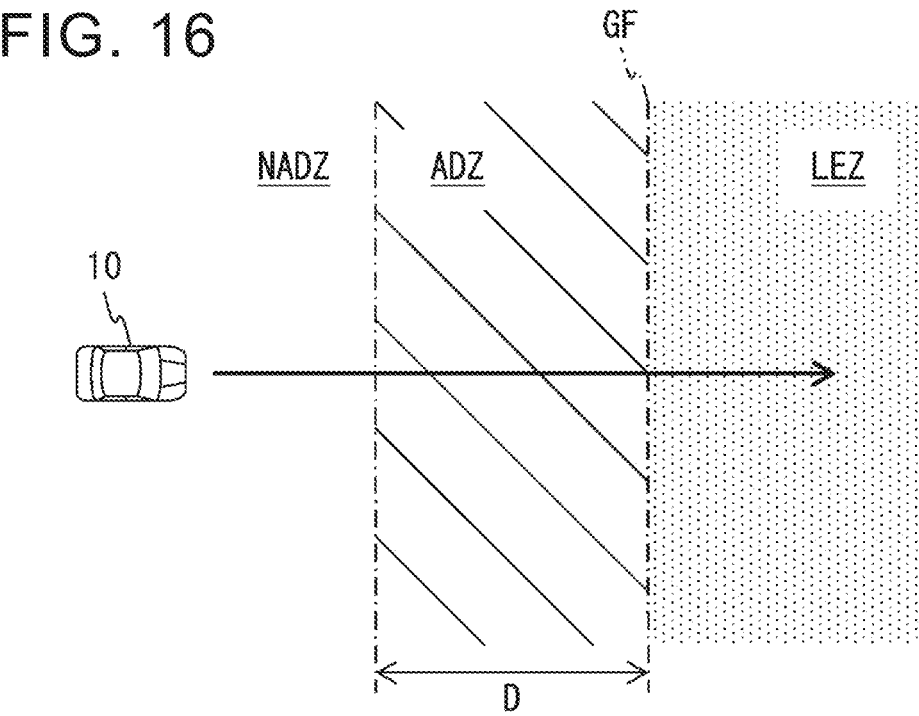
FIG. 16 schematically illustrates a low emission area and an adjacent area of a fourth embodiment according to the present disclosure.

Next, a fourth embodiment according to the present disclosure will be described with reference to FIGS. 16 to 18. The fourth embodiment according to the present disclosure is different from the third embodiment according to the present disclosure in the following points. In the fourth embodiment according to the present disclosure, as shown in FIG. 16, an adjacent area ADZ adjacent to the low emission area LEZ and a non-adjacent area NADZ located outside the adjacent area ADZ are defined outside the low emission area LEZ. For example, the adjacent area ADZ is an area where the distance from the boundary GF of the low emission area LEZ is shorter than a predetermined value D.

Position information of the adjacent area ADZ is stored in, e.g., the storage device 31 of the server 30.

In the third embodiment according to the present disclosure, when it is determined that the vehicle 10 is located outside the low emission area LEZ, data necessary for the learning action is repeatedly sent from the vehicle 10 to the server 30. However, only the most recent data is used for the learning action of the server 30. Moreover, the learning action of the server 30 will not be performed unless the vehicle 10 enters the low emission area LEZ.

Therefore, in the fourth embodiment according to the present disclosure, data necessary for the learning action will not be sent from the vehicle 10 to the server 30 when it is determined that the vehicle 10 is located in the non-adjacent area NADZ. The data necessary for the learning action will be sent from the vehicle 10 to the server 30 when it is determined that the vehicle 10 is located in the adjacent area ADZ. This configuration limits the number of times data is sent and received and limits power consumption required for the data transmission and reception.

In particular, when it is determined that the vehicle 10 has entered the adjacent area ADZ from the non-adjacent area NADZ, it is expected that the vehicle 10 will subsequently enter the low emission area LEZ. Therefore, in the fourth embodiment according to the present disclosure, the data is sent from the vehicle 10 to the server 30 when it is determined that the vehicle 10 has entered the adjacent area ADZ from the non-adjacent area NADZ. In this case, the data is sent from the vehicle 10 to the server 30 when it is expected that the vehicle 10 will enter the low emission area LEZ.

Figure 17:
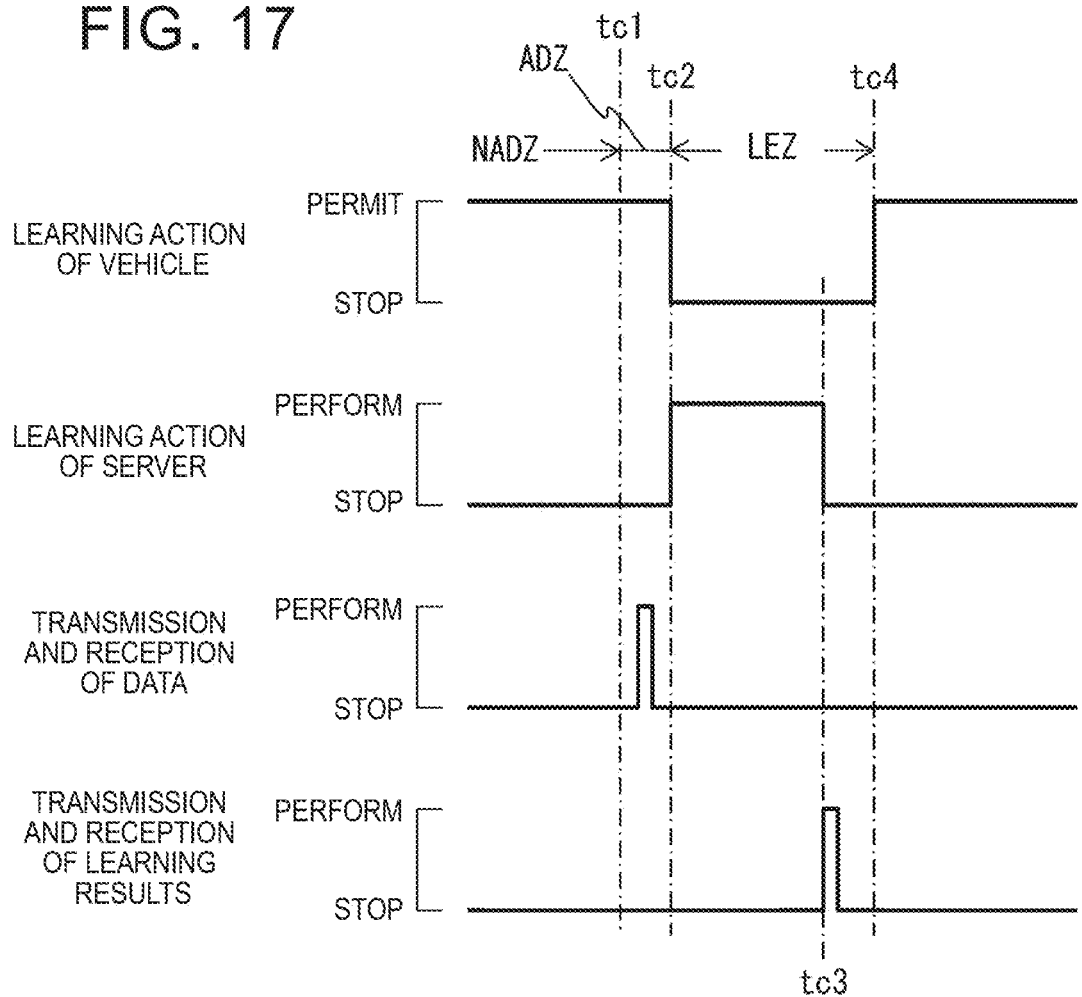
FIG. 17 is a timing chart illustrating the fourth embodiment according to the present disclosure.

In an example shown in FIG. 17, it is determined until time tc1 that the vehicle 10 is located in the non-adjacent area NADZ. Data necessary for the learning action is therefore not sent from the vehicle 10 to the server 30 until time tc1. When it is determined at time tc1 that the vehicle 10 has entered the adjacent area ADZ, the data is sent from the vehicle 10 to the server 30. Subsequently, when it is determined at time tc2 that the vehicle 10 has entered the low emission area LEZ, the learning action of the vehicle 10 is stopped and the learning action of the server 30 is started. When the learning action of the server 30 is then completed at time tc3, the learning results are sent from the server 30 to the vehicle 10. When it is then determined at time tc4 that the vehicle 10 has left the low emission area LEZ, the learning action of the vehicle 10 is permitted again.

Figure 18:
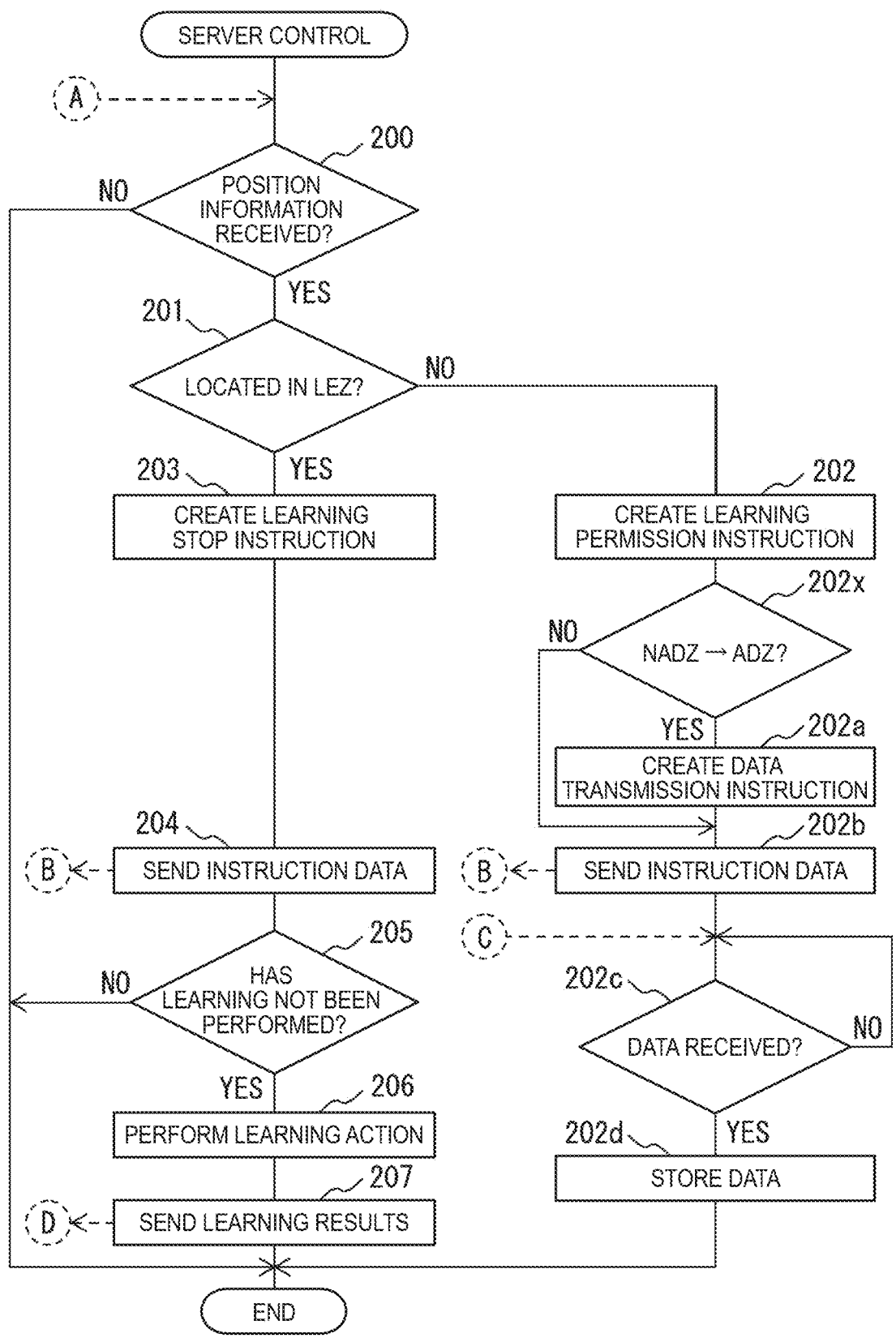
FIG. 18 is a flowchart of a server control routine of the fourth embodiment according to the present disclosure.

FIG. 18 illustrates a routine for performing control of the server 30 in the fourth embodiment according to the present disclosure. The routine of FIG. 18 is different from the routine of FIG. 15 in the following points. In the routine of FIG. 18, the routine proceeds from step 202 to step 202x, and it is determined whether the vehicle 10 has entered the adjacent area ADZ from the non-adjacent area NADZ. When it is determined in step 202x that the vehicle 10 has not entered the adjacent area ADZ from the non-adjacent area NADZ, the routine proceeds to step 202b, and instruction data is sent to the vehicle 10. In this case, the instruction data does not include a data transmission instruction. When it is determined in step 202x that the vehicle 10 has entered the adjacent area ADZ from the non-adjacent area NADZ, the routine proceeds to step 202a, and a data transmission instruction is created. Thereafter, in step 202b, instruction data including the data transmission instruction is sent to the vehicle 10.

In the third embodiment and the fourth embodiment according to the present disclosure, the learning results of the server 30 are sent to the vehicle 10 when it is determined that the vehicle 10 is located in the low emission area LEZ. In another embodiment (not shown), the learning results of the server 30 are sent to the vehicle 10 after the vehicle 10 leaves the low emission area LEZ. This configuration further limits power consumption when the vehicle 10 is located in the low emission area LEZ.

In the above various embodiments according to the present disclosure, the server 30 determines whether the vehicle 10 is located in the low emission area LEZ. In another embodiment (not shown), the electronic control unit 20 of the vehicle 10 includes a position determination unit, and the position determination unit determines whether the vehicle 10 is located in the low emission area LEZ. In this case, in one example, the position information of the low emission area LEZ is stored in the vehicle 10. In another example, the position information of the low emission area LEZ is stored in the server 30, and the vehicle 10 receives the position information of the low emission area LEZ from the server 30 and determines whether the vehicle 10 is located in the low emission area LEZ.

In still another embodiment (not shown), at least two of the above various embodiments according to the present disclosure are combined.

What is claimed is:

1. A control system for a hybrid vehicle, comprising:
   an on-board learning unit mounted on the hybrid vehicle and configured to perform a learning action;
   a position determination unit configured to determine whether the hybrid vehicle is located in a low emission area where operation of an internal combustion engine is supposed to be restricted; and
   a learning control unit configured to at least partially stop the learning action of the on-board learning unit when determination is made that the hybrid vehicle is located in the low emission area, wherein:
   the hybrid vehicle includes the internal combustion engine and an electric motor; and
   a drive mode of the hybrid vehicle is switchable between an electric vehicle mode and a hybrid vehicle mode, the electric vehicle mode being a mode in which the internal combustion engine is stopped and the electric motor is operated, and the hybrid vehicle mode being a mode in which the internal combustion engine and the electric motor are operated.

2. The control system according to claim 1, wherein the learning control unit is configured to entirely stop the learning action of the on-board learning unit when determination is made that the hybrid vehicle is located in the low emission area.

3. The control system according to claim 1, wherein in a case where determination is made that the hybrid vehicle is located in the low emission area, the learning control unit is configured to, at least partially stop the learning action of the on-board learning unit when determination is made that a state of charge of a battery of the hybrid vehicle is lower than a predetermined threshold, and is configured not to stop the learning action of the on-board learning unit when determination is made that the state of charge of the battery is equal to or higher than the threshold.

4. The control system according to claim 3, wherein the learning control unit is configured to increase a proportion of the learning action of the on-board learning unit that is stopped as the state of charge of the battery decreases when determination is made that the hybrid vehicle is located in the low emission area and determination is made that the state of charge of the battery is lower than the threshold.

5. The control system according to claim 1, further comprising a server learning unit mounted on a server located outside the hybrid vehicle, and configured to perform a learning action, wherein the server learning unit is configured to perform the learning action to be performed by the on-board learning unit using data sent from the hybrid vehicle to the server and send a learning result of the server learning unit to the hybrid vehicle, when the learning action of the on-board learning unit is stopped.

6. The control system according to claim 5, wherein the learning control unit is configured to send the data from the hybrid vehicle to the server when determination is made that that the hybrid vehicle is located outside the low emission area.

7. The control system according to claim 6, wherein in a case where determination is made that the hybrid vehicle is located outside the low emission area, the learning control unit is configured not to send the data from the hybrid vehicle to the server when determination is made that the hybrid vehicle is located in a non-adjacent area that is not adjacent to the low emission area, and is configured to send the data from the hybrid vehicle to the server when determination is made that the hybrid vehicle is located in an adjacent area that is adjacent to the low emission area.

8. The control system according to claim 6, wherein the learning control unit is configured to repeatedly send the data from the hybrid vehicle to the server when determination is made that the hybrid vehicle is located outside the low emission area.

9. A control method for a hybrid vehicle, the control method comprising:
   performing a learning action by an on-board learning unit mounted on the hybrid vehicle;
   determining whether the hybrid vehicle is located in a low emission area where operation of an internal combustion engine is supposed to be restricted; and
   at least partially stopping the learning action of the on-board learning unit when determination is made that the hybrid vehicle is located in the low emission area, wherein the hybrid vehicle includes the internal combustion engine and an electric motor, and a drive mode of the hybrid vehicle is switchable between an electric vehicle mode and a hybrid vehicle mode, the electric vehicle mode being a mode in which the internal combustion engine is stopped and the electric motor is operated, and the hybrid vehicle mode being a mode in which the internal combustion engine and the electric motor are operated.

* * * * *